(12) United States Patent
Shimizu

(10) Patent No.: US 10,677,328 B2
(45) Date of Patent: Jun. 9, 2020

(54) BRIDGE-TYPE BALL SCREW AND MANUFACTURING METHOD THEREOF

(71) Applicant: NTN Corporation, Osaka (JP)

(72) Inventor: Tatsunori Shimizu, Iwata (JP)

(73) Assignee: NTN Corporation, Osaka-shi (JP)

( * ) Notice: Subject to any disclaimer, the term of this patent is extended or adjusted under 35 U.S.C. 154(b) by 218 days.

(21) Appl. No.: 15/668,842

(22) Filed: Aug. 4, 2017

(65) Prior Publication Data

US 2017/0335934 A1  Nov. 23, 2017

Related U.S. Application Data

(63) Continuation of application No. PCT/JP2016/053208, filed on Feb. 3, 2016.

(30) Foreign Application Priority Data

Feb. 4, 2015 (JP) ................ 2015-019955

(51) Int. Cl.
*F16H 25/22* (2006.01)
*B21D 39/00* (2006.01)
*B21K 1/70* (2006.01)
*B22F 3/02* (2006.01)
*F16H 25/24* (2006.01)
(Continued)

(52) U.S. Cl.
CPC ......... *F16H 25/2223* (2013.01); *B21D 39/00* (2013.01); *B21K 1/70* (2013.01); *B22F 3/02* (2013.01); *B22F 3/12* (2013.01); *C21D 1/18* (2013.01); *F16H 25/24* (2013.01); *F16H 2025/2481* (2013.01)

(58) Field of Classification Search
CPC .... F16H 25/2214; F16H 25/2223; B22F 3/12; B21D 39/00; B21K 1/70
USPC .... 74/424.87; 29/525.02, 525.05, 34 R, 788, 29/796
See application file for complete search history.

(56) References Cited

U.S. PATENT DOCUMENTS 8,950,283 B2 * 2/2015 Watanabe ................ B21J 5/12
74/424.82
2006/0196291 A1 * 9/2006 Yoshioka ............ F16H 25/2223
74/424.87
(Continued)

FOREIGN PATENT DOCUMENTS

JP  2005-121042  5/2005
JP  2005-299719  10/2005
(Continued)

*Primary Examiner* — William C Joyce
*Assistant Examiner* — Randell J Krug
(74) *Attorney, Agent, or Firm* — Harness, Dickey & Pierce, P.L.C.

(57) ABSTRACT

A method of manufacturing a bridge-type ball screw (1) with a bridge member (5) fit into a nut bridge window (6). The bridge member (5) has a linking groove (5a) with a rolling track that acts as a circulating path. After the bridge member (5) is fit into the nut bridge window (6), a cylindrical mandrel (8), with projections (9), is inserted into the nut (3). An upper die (10) restricts the upper surface of the bridge member (5) and is lowered while the nut (3) is held between the upper die (10) and the mandrel (8). A connection part is subject to plastic working by the projections (9) of the mandrel (8). The bridge member (5) is simultaneously deformed by the upper die (10) to secure the bridge member (5) into the nut bridge window (6).

4 Claims, 5 Drawing Sheets

(51) Int. Cl.
*B22F 3/12* (2006.01)
*C21D 1/18* (2006.01)

(56) References Cited

U.S. PATENT DOCUMENTS

| | | | | |
|---|---|---|---|---|
| 2006/0207361 A1* | 9/2006 | Kazuno | ............... | F16H 25/2223 74/89.44 |
| 2007/0240532 A1* | 10/2007 | Osterlanger | ........ | F16H 25/2223 74/424.87 |
| 2013/0139628 A1* | 6/2013 | Yokoyama | ............ | B23P 15/003 74/424.86 |
| 2013/0220047 A1* | 8/2013 | Yokoyama | .......... | F16H 25/2223 74/424.87 |

FOREIGN PATENT DOCUMENTS

| | | |
|---|---|---|
| JP | 2008-281063 | 11/2008 |
| JP | 2008-286353 | 11/2008 |
| JP | 2012-082961 | 4/2012 |
| JP | 2014-145463 | 8/2014 |

\* cited by examiner

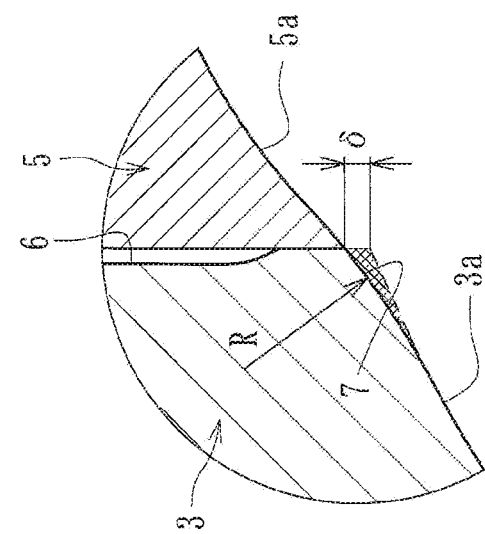
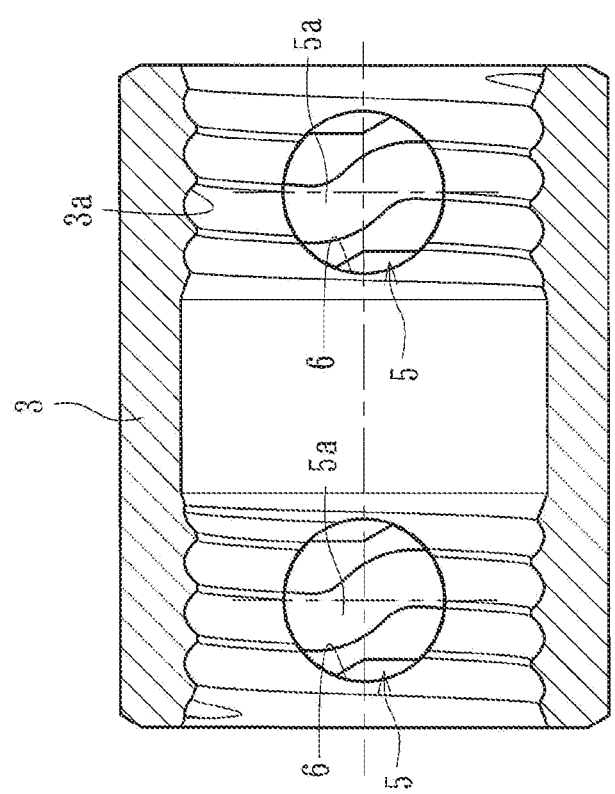
Fig. 2(b)
Fig. 2(a)

BRIDGE-TYPE BALL SCREW AND MANUFACTURING METHOD THEREOF

CROSS-REFERENCE TO RELATED APPLICATIONS

This application is a continuation of International Application No. PCT/JP2016/053208, filed Feb. 3, 2016, which claims priority to Japanese Application No. 2015-019955, filed Feb. 4, 2015. The disclosures of the above applications are incorporating herein by reference.

FIELD

The present disclosure relates to a ball screw used in various machine tools such as electric discharging machines and tapping centers etc., or an electric power steering and actuators etc. for automobiles, more particularly, it relates to a bridge-type ball screw with a bridge member to circulate balls and its manufacturing method.

BACKGROUND

The ball screw has a screw shaft, nut, balls and a circulating mechanism. The screw shaft has a helical screw groove on its outer circumference. The nut has a helical screw groove on its inner circumference. The nut is mated with the screw shaft. The large number of balls are accommodated within a rolling track formed by the opposite screw grooves. The circulating mechanism enables the rolling track to act as a circulating track. It is used as a motion conversion mechanism to linearly drive the screw shaft by rotating the nut.

In general, there are various types of ball circulating mechanisms in the ball screw. One of which is a bridge-type mechanism. The bridge-type ball screw has a linking track for the screw grooves. The bridge members are mounted on a nut to make a rolling track a circulating track. Thus, its structure is relatively simple and compact.

In such a bridge-type ball screw, the bridge member, for circulating balls, is fit into a through hole formed in a cylindrical barrel of the nut. However, steps are caused in the ball transfer part that connects the nut screw grooves and the circulating grooves, formed as "S"-shaped curves, on an inner surface of the bridge member. These steps cause abnormal noise and thus reduce the life of the ball screw. A ball screw 51 is known and shown in FIG. 6 that can solve these problems. The ball screw 51 has a screw shaft 52 formed with a helical screw groove 52a on its outer circumference. A nut 53 has a screw groove 53a on its inner circumference and is mated with the screw shaft 52. A large number of balls 54 is accommodated within a rolling track formed by the opposite screw grooves 52a, 53a. Instead of the bridge members, this ball screw 51 uses a circulation groove (linking track) 53b formed by plastically working the inner circumference of the nut 53. Then, the screw groove 53a is formed by cutting with a rotary tool.

This prior art ball screw guides balls 54 between the nut screw groove 53a and the circulation grooves 53b without causing abnormal noise or torque variation (catching etc.). Thus, it suppresses life reduction (e.g., see JP2012-82961 A1).

However, this prior art method cannot avoid the generation of steps or edges due to the variation of the plastic working and cutting working. In addition, the formation of the screw groove 53a, by a rotary tool, needs a very long cycle time. Thus, it is not preferable due to the increase in the manufacturing cost.

Another ball screw 59 has been proposed as shown in FIG. 7. In this ball screw 59, balls 57 are set in a nut screw groove 56 and a bridge member 58. A circulation groove (linking groove) 58a is mounted on the nut 55. When assembling the ball screw 59, it is possible to efficiently eliminate the step between the nut screw groove 56 and the bridge circulation groove 58a by mounting the bridge member 58, coated with a coating layer 60, on a boundary surface 58b of the bridge member 58 forming a boundary with a surface 56a of the screw groove 56; engaging the nut 55 with a screw shaft; circulating the balls 57 between the screw groove 56 and the circulation groove 58a; and cutting protruded portion 60a, of the coating layer 60, into the screw groove 56 from the surface 56a of the screw groove 56 (e.g., see JP 2014-145463 A).

However, in the prior art ball screw 59, it is believed that the coating layer 60 would be peeled off by repeated passing of the rolling balls 57. Thus, the durability and reliability, as well as life of the ball screw, would be impaired. Additionally, abnormal noise would also be caused by the peeled debris.

SUMMARY

The disclosure is focused on plastically working the ball transfer part where the bridge member linking groove and the nut screw groove are connected. It is an object of the present disclosure to provide a bridge-type ball screw with low manufacturing cost that improves durability and reliability. Also, it can prevent the generation of abnormal noise while eliminating and smoothening the step in the ball transfer part.

To achieve the object of the present disclosure, a bridge-type ball screw comprises a screw shaft, a nut, a plurality of balls, and bridge members. The screw shaft has a helical screw groove on its outer circumference. The nut inner circumference has a helical screw groove. The nut mates with the screw shaft. The plurality of balls are accommodated within a rolling track formed by the opposite screw grooves. The bridge members are each formed on their inner surface with a linking groove to make the rolling track a circulating track. The bridge members are fit into bridge windows formed on a barrel of the nut. At least a connection part between the bridge member linking groove and the nut ball transfer part is smoothly formed by plastic working.

The bridge-type ball screw of the present disclosure has bridge members. Each is formed on its inner surface with a linking groove to make the rolling track a circulating track. The bridge members are fit into bridge windows formed on a barrel of the nut. At least, a connection part between the bridge member linking groove and the nut ball transfer part is smoothly formed by plastic working. Thus, it is possible to provide a bridge-type ball screw with low manufacturing cost that improves durability and reliability. It can prevent the generation of abnormal noise caused by passage of balls while eliminating and smoothening the step of the ball transfer part.

The ball transfer part of the screw groove of the nut is continuous to the end of the linking groove of the bridge member. It is formed as a convex surface with a predetermined radius of curvature. This makes it possible to smoothly form the connection part between the linking groove and the ball transfer part.

The bridge member is formed from sintered metal formed by MIM (Metal Injection Molding). This makes it possible to form the bridge member with a desirable exact configuration and dimensions even though the bridge member needs high working accuracy and has a complicated configuration.

A radially outer-side opening portion of a nut bridge window has an engagement part. The engagement part has a diameter larger than that of the bridge window. The bridge member is secured to the nut by plastically deforming several points of the radially outer periphery of the bridge member. Thus, they are in close contact with the engagement part.

A method of manufacturing a bridge-type ball screw comprises providing a screw shaft, nut, plurality of balls, and bridge members. The screw shaft has a helical screw groove on its outer circumference. The nut has a helical screw groove on its inner circumference. The nut is mated with the screw shaft. The plurality of balls are accommodated within a rolling track formed by the opposite screw grooves. The bridge members are each formed with a link groove on its inner surface to make the rolling track a circulating track. The bridge members are fit into bridge windows formed on a barrel of the nut. Further, a cylindrical mandrel, having projections, is inserted into the nut after having fit the bridge members in the nut bridge windows. The projections of the mandrel are pressed onto both the bridge members linking groove and the ball transfer parts of the nut screw grooves. This forms connection parts between the bridge members and the nut by plastic working.

The method of manufacturing a bridge-type ball screw has bridge members. Each is formed on its inner surface with a linking groove to make the rolling track a circulating track. The bridge members are fit into bridge windows formed on a barrel of the nut. A cylindrical mandrel, having projections, is inserted into the nut after having fit the bridge members into the bridge windows of the nut. The projections of the mandrel are pressed onto both the bridge member linking groove and the ball transfer parts of the nut screw grooves. This forms connection parts between the bridge members and the nut by plastic working. Thus, it is possible to smoothly form a connection part between the bridge member linking groove and a ball transfer part of the nut. Also, this provides a bridge-type ball screw with low manufacturing cost that has improved durability and reliability. Also, it can prevent the generation of abnormal noise caused by passage of balls while eliminating and smoothening the step of the ball transfer part.

Each of the projections of the mandrel is formed with a configuration. The configuration includes a bridge forming part corresponding to the bridge member linking groove and connection parts corresponding to the ball transfer part of the nut screw groove. This makes it possible to smoothly form the connection part between the bridge member linking groove and the nut screw groove.

An upper die is arranged above the nut. The upper die restricts the upper surface of the bridge member when it is lowered under a condition where the mandrel is horizontally supported. It is further lowered under a condition where the nut is sandwiched and supported by the upper die and the mandrel to plastically work the connection parts between the bridge member linking grooves and the nut screw grooves. It simultaneously perform plastic deformation of the upper surface of the bridge member in order to secure the bridge member to the bridge window of the nut by caulking the upper surface of the bridge member. This makes it possible to prevent the bridge member from being moved during the plastic working of the outer surface of the bridge member.

Thus, this prevents the generation of steps between the linking grooves and the screw grooves. Accordingly, it is possible to achieve efficient fixation of the bridge member and reduction of the manufacturing cost.

The nut and the bridge member are simultaneous hardened by heat treatment after the plastic working. This makes a high frequency temper treatment unnecessary as in the prior art to prevent the generation of cracks when caulking and securing the bridge member to the nut. Thus, it reduces the manufacturing cost.

The bridge-type ball screw of the present disclosure comprises a screw shaft, nut, plurality of balls and bridge members. The screw shaft has a helical screw groove formed on its outer circumference. The nut has a helical screw groove formed on its inner circumference. The nuts mate with the screw shaft. The plurality of balls are accommodated within a rolling track formed by the opposite screw grooves. The bridge members are each formed on their inner surface with a linking groove to make the rolling track a circulating track. The bridge members are fit into bridge windows formed on a barrel of the nut. At least a connection part, between the bridge member linking groove and the nut ball transfer part, is smoothly formed by plastic working. Thus, it is possible to provide a bridge-type ball screw with low manufacturing cost that has improved durability and reliability. It can prevent the generation of abnormal noise caused by passage of balls while eliminating and smoothening the step of the ball transfer part.

In addition, the method for manufacturing a bridge-type ball screw of the present disclosure provides a screw shaft, nut, plurality of balls and bridge members. The screw shaft has a helical screw groove formed on its outer circumference. The nut has a helical screw groove formed on its inner circumference. The nut mates with the screw shaft. The plurality of balls are accommodated within a rolling track formed by the opposite screw grooves. The bridge members are each formed on their inner surface with a linking groove to make the rolling track a circulating track. The bridge members are fit into bridge windows formed on a barrel of the nut. A cylindrical mandrel, having projections, is inserted into the nut after having fit the bridge members in the bridge window of the nut. The projections of the mandrel, both onto the bridge member linking groove and ball transfer parts of the nut screw grooves, are pressed to form connection parts between the bridge members and the nut by plastic working. Thus, it is possible to smoothly form a connection part between the bridge member linking groove and a ball transfer part of the nut. Also, this provides a bridge-type ball screw with low manufacturing cost that has improved durability and reliability. Also, it can prevent the generation of abnormal noise caused by passage of balls while eliminating and smoothening the step of the ball transfer part.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2(a) is a longitudinal section view of a nut.

FIG. 2(b) is a partial cross-sectional view of a ball transfer part of a screw groove of the nut of FIG. 2(a).

DETAILED DESCRIPTION

The present disclosure is a method for manufacturing a bridge-type ball screw with a screw shaft, a nut, a plurality of balls and bridge members. The screw shaft has a helical screw groove formed on its outer circumference. The nut has a helical screw groove formed on its inner circumference. The nut mates with the screw shaft. The plurality of balls are accommodated within a rolling track formed by the opposite screw grooves. The bridge members are each formed on their inner surface with a linking groove to make the rolling track a circulating track. The bridge members are fit into a bridge window formed on a barrel of the nut. A cylindrical mandrel, having projections, is inserted into the nut after having fit the bridge members in the bridge windows of the nut. An upper die is arranged above the nut and restricts the upper surface of the bridge member as the upper die is lowered under a condition where the mandrel is horizontally supported. The nut is further lowered under a condition where the nut is sandwiched and supported by the upper die and the mandrel to plastically work the connection parts between the bridge member linking grooves and the nut screw grooves. This simultaneously perform plastic deformation of the upper surface of the bridge member in order to secure the bridge member to the bridge window of the nut, by caulking the upper surface of the bridge member.

The embodiment of the present disclosure will be hereinafter described with reference to the drawings.

Figure 1A:
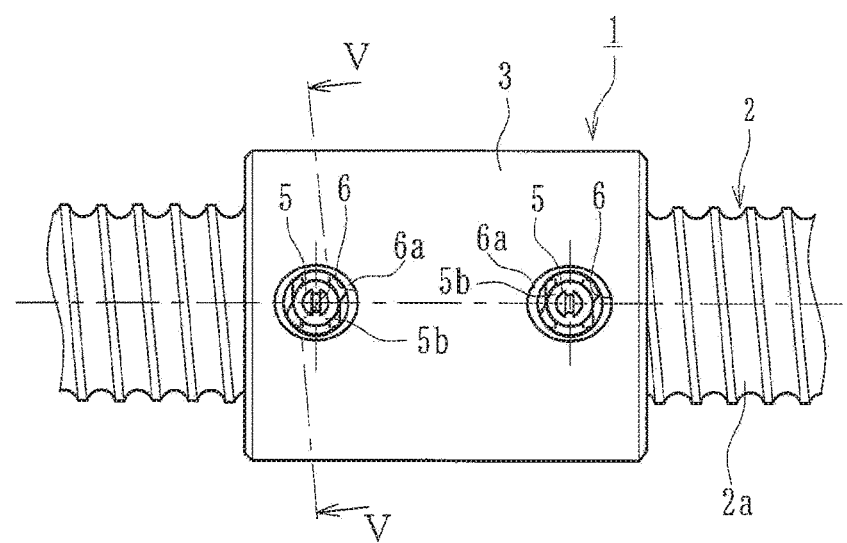
FIG. 1(a) is a plan view of one preferable embodiment of a bridge-type ball screw.
Figure 1B:
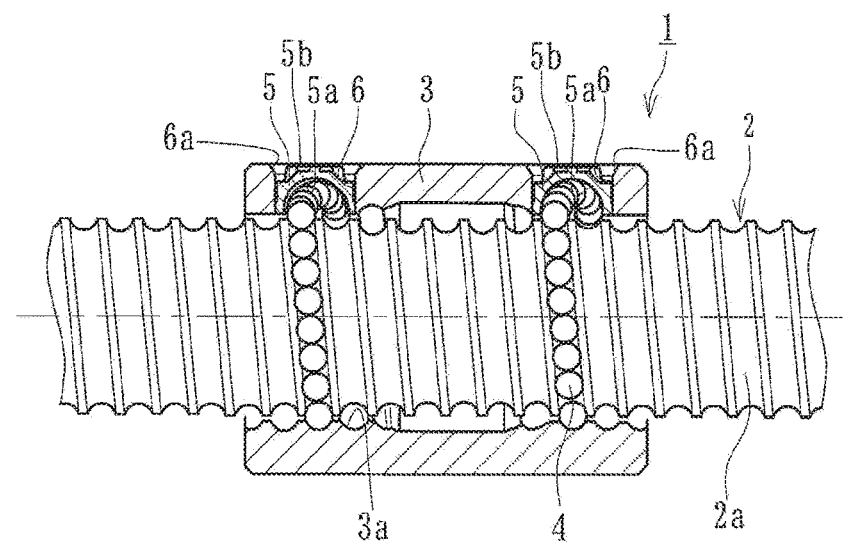
FIG. 1(b) is a longitudinal section view of FIG. 1(a).
Figure 3:
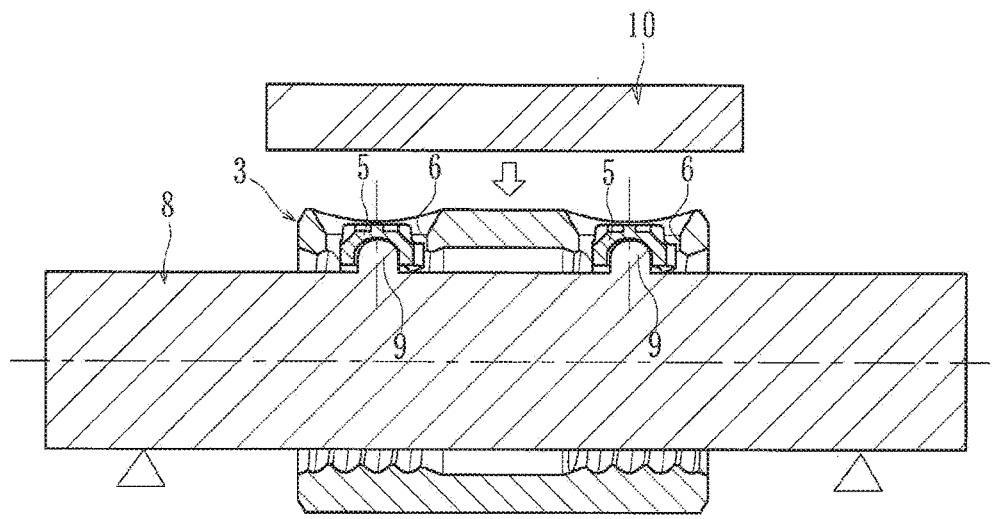
FIG. 3 is an explanatory view of a method for manufacturing a bridge-type ball screw.
Figure 4A:
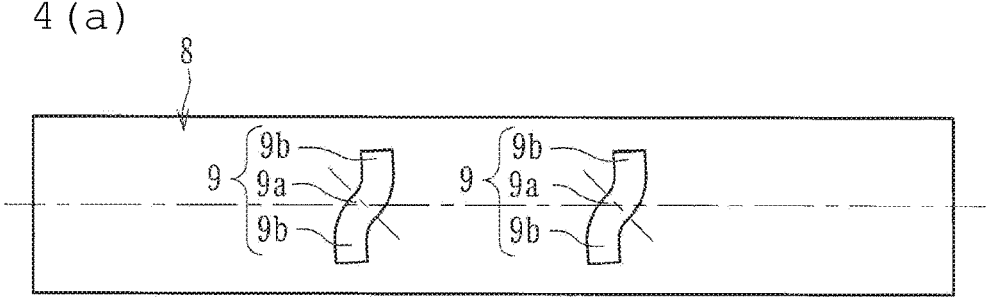
FIG. 4(a) is a plan view of a mandrel used for the working of FIG. 3.
Figure 4B:
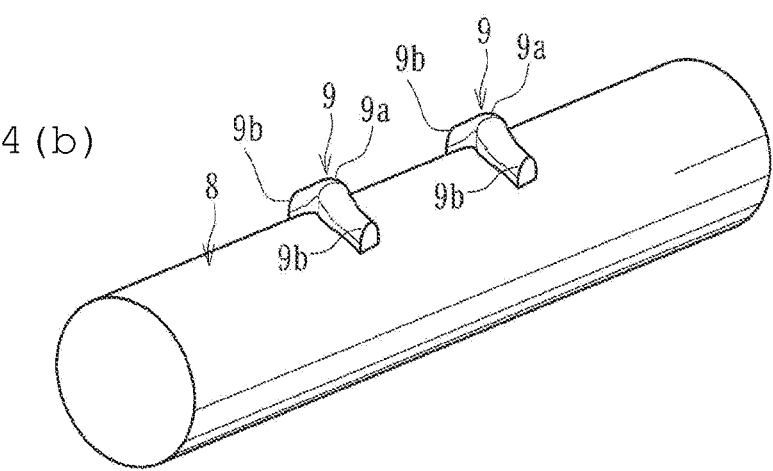
FIG. 4(b) is a perspective view FIG. 4(a).
Figure 5A:
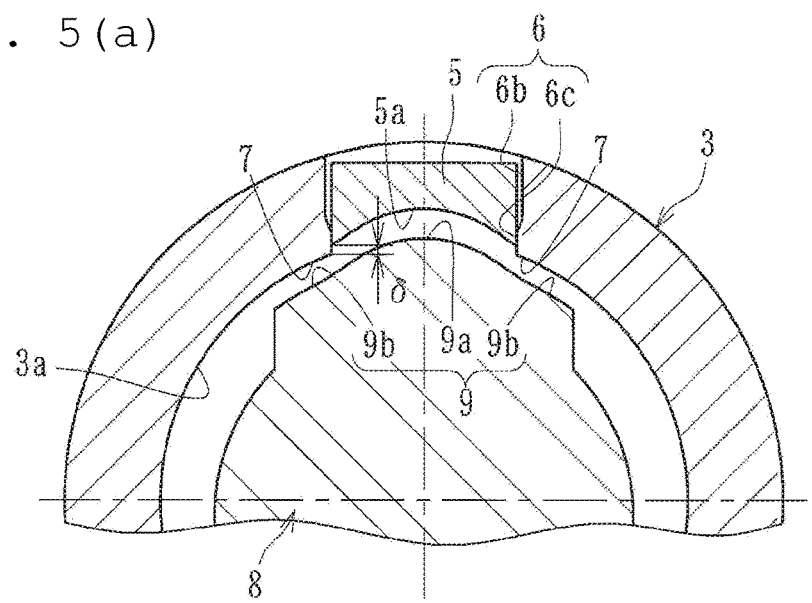
FIG. 5(a) is a cross-sectional explanation view taken along a line V-V of FIG. 1 and of a state before the working.
Figure 5B:
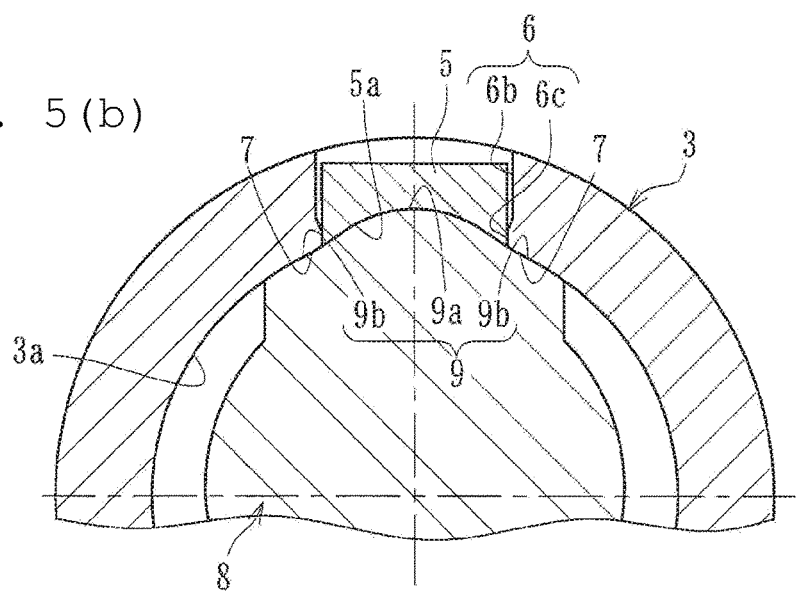
FIG. 5(b) is a cross-sectional explanation view taken along a line V-V of FIG. 1 and of a state during the working.
Figure 6:
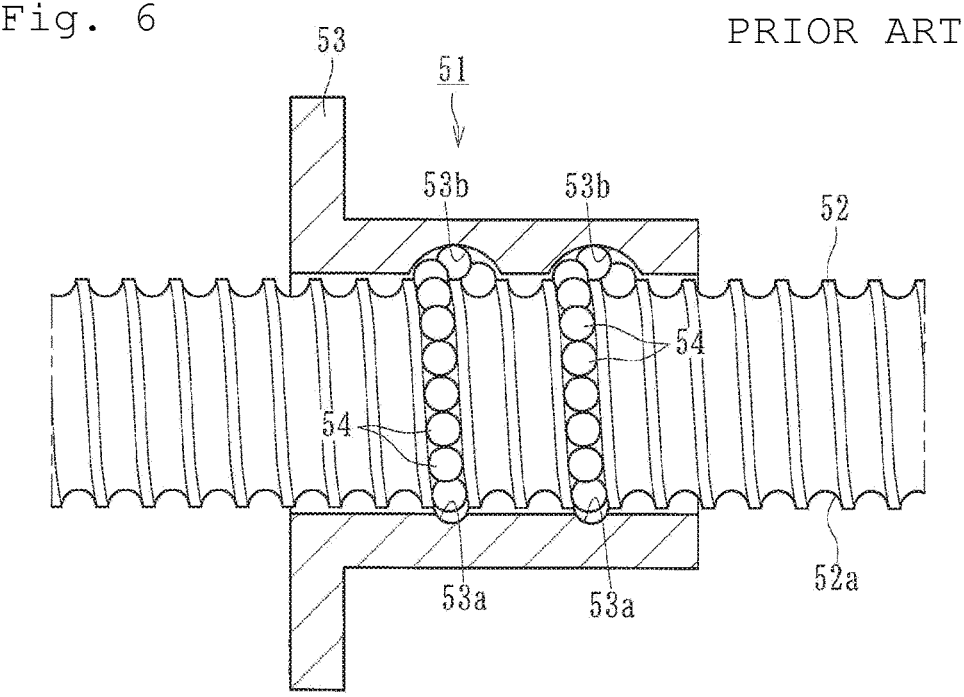
FIG. 6 is a longitudinal cross-section view of a prior art ball screw.
Figure 7:
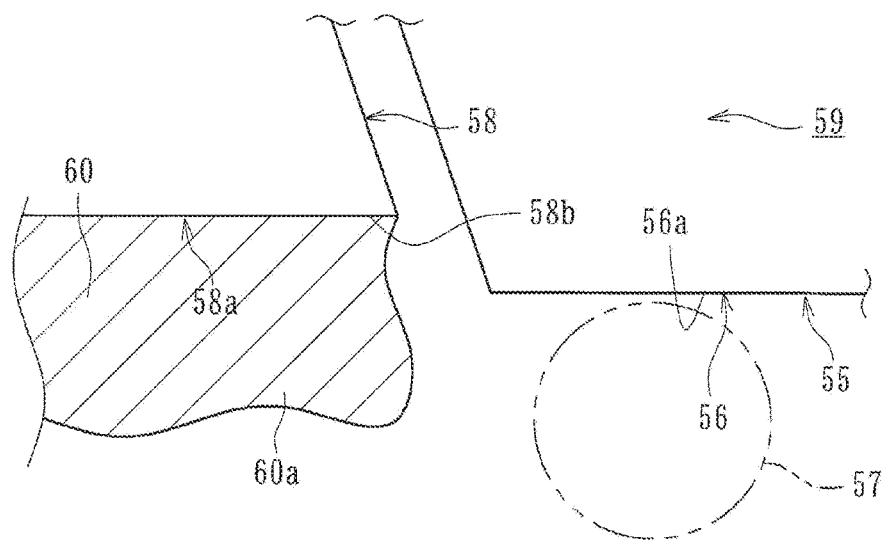
FIG. 7 is a schematic view of a prior art step between a circulating groove of the bridge member and a screw groove of the nut before adjustment of the bridge-type ball screw.

FIG. 1(a) is a plan view of one preferable embodiment of a bridge-type ball screw. FIG. 1(b) is a longitudinal section view of FIG. 1(a). FIG. 2(a) is a longitudinal section view of a nut. FIG. 2(b) is a partial cross-sectional view of a ball transfer nut of a screw groove of the nut of FIG. 2(a). FIG. 3 is an explanatory view of a method for manufacturing the bridge-type ball screw. FIG. 4(a) is a plan view of a mandrel used for the working of FIG. 3. FIG. 4(b) is a perspective view FIG. 4(a). FIG. 5(a) is a cross-sectional explanation view taken along a line V-V of FIG. 1 and of a state before the working. FIG. 5(b) is a cross-sectional explanation view taken along a line V-V of FIG. 1 and of a state during the working.

A bridge-type ball screw 1 is shown in FIGS. 1(a) and (b). A screw shaft 2 has a helical screw groove 2a formed on its outer circumference. A nut 3 has a helical screw groove 3a formed on its inner circumference. The nut engages with the screw shaft 2. A number of balls 4 is accommodated within a rolling track formed by the opposite screw grooves 2a, 3a. Bridge members 5, 5 circulate the balls 4.

The cross-sectional configuration of each of screw grooves 2a, 3a may be either one of a circular-arc or Gothic-arc configuration. However, the Gothic-arc configuration is adopted in this embodiment. It can have a large contacting angle with the ball 4 and sets a small axial gap. This provides a large rigidity against the axial load and thus suppresses the generation of vibration.

The nut 3 is formed from medium carbon carburized steel such as SCM 430 or SCM 435 etc. including C of 0.30 to 0.35 wt %. Bridge windows 6, 6 are formed on a cylindrical barrel of the nut 3. Each bridge window 6 has a substantially circular configuration and extends through the outer and inner surfaces partially cutting out the screw groove 3a. Each bridge member 5 has a circular configuration corresponding to the bridge window 6. The bridge member 5 is fit into the bridge window 6. A linking groove 5a, mutually connecting adjacent one laps of the screw grooves 3a, is formed on the inner circumference of the bridge member 5. This forms the rolling track for balls 4 cooperating with a substantially one lap of the screw groove 3a. A large number of balls 4 are accommodated between the screw grooves 2a, 3a of the rolling track roll along the screw grooves 2a, 3a. The balls 4 are guided into the bridge member linking groove 5a and then ride over the screw thread of the screw shaft 2. The balls 4 return to the screw groove 3a and roll again along the screw grooves 2a, 3a. In this case, although the illustrated configurations of the bridge window 6 and bridge member 5 are circular, other configurations, such as an ellipse, may be used.

As shown in FIG. 2(a), the bridge member linking groove 5a is formed as an "S"-shaped curve in order to smoothly connect the mutually adjacent screw grooves 3a, 3a as well as between the linking groove 5a and the screw grooves 3a. In addition, a depth of the linking groove 5a is set so that the balls 4 can ride over the screw thread of the screw shaft screw groove 2a within the bridge member linking groove 5a.

The bridge member 5 is formed from a sintered alloy by an injection molding machine that molds plastically prepared metallic powder. In this injection molding, metallic powder and binder, including plastics and wax, are firstly mixed and kneaded by a mixing and kneading machine. This forms pellets from the mixed and kneaded material. The pellets are fed into a hopper of the injection molding machine. Then, they are pushed into dies under a heated and melted state. Finally, it forms the bridge member by a so-called MIM (Metal Injection Molding). The MIM method can easily mold sintered alloy material into articles with desirable accurate configurations and dimensions even though the article requires high manufacturing technology and has a hard to form configuration.

One example of metallic powder for the sintering alloy able to be carburized is SCM415 comprising C of 0.13 wt %, Ni of 0.21 wt %, Cr of 1.1 wt %, Cu of 0.04 wt %, Mn of 0.76 wt %, Mo of 0.19 wt %, Si of 0.20 wt % and the remainder Fe etc.

Other than the metallic powder for sintering alloy formed by MIM described above, other examples of sintering alloy powders are completely alloyed powder of Fe, Mo and Ni, atomized iron powder of alloyed and melted steel where alloyed components are uniformly distributed in grains, or partially alloyed powder, alloyed powder in which partially alloyed powder is adhered to pure iron powder. More particularly, one example is a hybrid type alloyed powder, trade name JIP21SX of JFE steel Co., Japan. Here a prealloy copper powder comprising Fe of 2% by weight, Ni of 1% by weight and Mo is adhered to fine Ni powder, Cu powder and graphite powder via a binder. This hybrid type alloyed powder is able to obtain high mechanical strength, tensioning strength and hardness, due to an increase of the martensite phase ratio to the metallic structure of sintered body while increasing the cooling speed, higher than 50° C. min, after sintering. This eliminates heat treatment after sintering. Also, it provides the bridge member 5 with high accuracy. It is preferable to add Mo of 0.5 to 1.5%, by weight, in order to improve the hardenability and Ni of 2 to 4%, by weight, in order to improve the toughness of the sintered body.

Incorporation of balls 4 into the bridge-type ball screw 1 can be performed after the bridge members 5 have been mounted in the bridge windows 6 of the nut 3. They enter from the radially outwardly of the nut 3, by abutting the nut 3 against one end of the screw shaft 2. The nut 3 is rotated while sequentially introducing the balls 4 into the space between the screw grooves 2a, 3a, and moving the nut 3 along the screw shaft 2. Alternatively, the balls 4 may be similarly introduced using a temporary shaft after the bridge members 5 are mounted in the bridge windows 6.

As shown in FIG. 2(b), steps δ (shown by cross-hatchings) is generated due to variations in dimensions etc. at the ball transfer parts 7. This is where the bridge member linking grooves 5a and nut screw grooves 3a are connected under a condition where the bridge members 5 are fit into the nut bridge windows 6. The steps δ of the ball transfer parts 7 are plastically worked. The ball transfer parts 7 are formed by plastically deforming edge parts of the nut bridge windows 6. This occurs by pressing the nut 3, fit with the bridge members 5, by a cylindrical mandrel 8 having S-shaped projections 9. Each projection has a configuration corresponding to the bridge member linking groove 5a.

More particularly, the mandrel (lower die) 8 is inserted into the nut 3, as shown in FIG. 3, after the bridge members 5 are fit into the nut bridge windows 6. An upper die 10, arranged above the nut 3, is lowered while keeping the mandrel 8 horizontal. The upper die 10 is further lowered under a condition where the nut 3 is sandwiched between the upper die 10 and the mandrel 8. This enables plastic deformation to form configurations of the bridge member linking grooves 5a and the nut screw grooves 3a, connected to the linking grooves 5a, into the configurations of the projections 9.

As shown in FIGS. 4(a) and (b), the mandrel 8 is formed on its outer circumference with S-shaped projections 9. Each projection 9 has a configuration corresponding to the bridge member linking groove 5a. The outer circumferential surface of the projection 9 has a configuration including a bridge forming part (central part) 9a and connection parts 9b, 9b. The bridge forming part 9a corresponds to the bridge member linking groove 5a. The connection parts 9b, 9b correspond to the ball transfer part 7 of the nut screw groove 3a. In addition, an outer diameter of the body of the mandrel 8 is smaller than an inner diameter of the nut 3. Thus, this prevents interference of the mandrel 8 with nut 3.

Plastic working of the bridge member linking grooves 5a and the nut ball transfer parts 7 will be described with reference to FIG. 5. As shown in FIG. 5(a), the step δ is generated at the nut ball transfer parts 7 where bridge member linking groove 5a and the nut screw groove 3a are connected under a condition where the bridge member 5 is fit into the nut bridge window 6. The upper surface of the bridge member 5 is constrained by the upper die (not shown in FIG. 5) to prevent the bridge member 5 from a radially outward escape. By further lowering the upper die from this state, where the nut 3 is sandwiched between the upper die and the mandrel 8, the bridge member linking groove 5a and the nut ball transfer parts 7 connected to the linking groove 5a, are plastically deformed by the outer circumferential configuration of the projection 9. Each ball transfer part 7 is set so that it has a convex circular arc of a desirable radius of curvature R (FIG. 2(b)) continuous with the end of the linking groove 5a. Thus, it is possible to smoothly form the connection parts between the linking grooves 5a and the ball transfer parts 7.

The plastic working enables simultaneous forming, of bridge member linking grooves 5a and the ball transfer parts 7 of the nut screw grooves 3a, to a desired configuration. Accordingly, the steps at the ball transfer parts 7 are eliminated. The connection parts between the linking grooves 5a and the ball transfer parts 7 are smoothly formed. Thus, it is possible to provide a bridge-type ball screw with low manufacturing cost that has an improved durability and reliability and can prevent the generation of abnormal noise caused by passage of balls.

Although it is described that the bridge member 5 is previously formed by MIM, from sintering alloy powder, the linking groove 5a may be finished to a final configuration and dimensions or intermediate configuration and dimensions on MIM. That is, the linking groove 5a may be formed to a dimension maintaining the plastic working margin smaller than a final dimension and then formed to a final configuration and dimension by the mandrel 8, previously described.

As shown in FIG. 1(b), the radially outer-side opening part (engagement part) 6a of the nut bridge window 6 is formed with a tapered shape with a gradually increasing radially outwardly diameter. The bridge member 5 can be secured to the nut 3 by partially squeezing and plastically deforming several (four in the illustrated embodiment) points of the outer periphery 5b of the bridge member 5 until they are closely contacted with the opening part 6a.

In accordance with the present embodiment, the outer circumferential surfaces 5b are plastically deformed, as shown in FIG. 3, by the upper die 10. This simultaneously occurs with the plastic working of the bridge member linking grooves 5a and the ball transfer parts 7. The nut 3 is sandwiched between the upper die 10 and the mandrel 8. This prevents movement of the bridge member 5 during the plastic working of the outer circumferential surface 5b of the bridge member 5. Thus, this prevents the generation of steps between the linking grooves 5a and the ball transfer parts 7. In addition, it is further possible to efficiently secure the bridge members 5 and thus reduce the manufacturing cost of the ball screw.

As shown in FIG. 5, the radially outer-side opening part 6b of the nut bridge window 6 has an inner diameter larger than the outer diameter of the bridge member 5. The radially inner-side opening part 6c of the bridge window 6 has an inner diameter the same as the outer diameter of the bridge member 5 or has a small interference with it. This makes it possible to perform the insertion operation of the bridge member 5 into the bridge window 6 without inclination of the bridge member 5. This obtains a smooth flow of material of the bridge member 5 during the plastic working. Thus, this prevents the generation of an excessive stress on the bridge window 6.

Further according to the present embodiment, the nut 3 and the bridge member 5 are cementation quenched and tempered by a controlling temperature after the plastic working. This eliminates the high frequency tempering treatment to prevent the generation of cracking, etc. during squeezing of the bridge member into the nut. Thus, this reduces the manufacturing cost. The surface of the nut 3 is hardened by cementation quenching to 58 to 64 HRC. The bridge member 5 is hardened to 30 to 40 HRC. The nut 3 is formed from medium carbon cemented steel including carbon of 0.30 to 0.35 wt % such as SCM430 or SCM435. Thus, it is possible to reduce the heat treatment time for cementation quenching and also to suppress the generation of a grain boundary oxidation layer in the surface.

The bridge-type ball screw of the present disclosure can be applied to various bridge-type ball screw used for electric actuators of automobiles.

The present disclosure has been described with reference to the preferred embodiment. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

What is claimed is:

1. A method for manufacturing a bridged ball screw comprising:
    providing a screw shaft, a nut, a plurality of balls and bridge members, the screw shaft has a helical screw groove on its outer circumference, the nut has a helical screw groove on its inner circumference, the nut mates with the screw shaft, the plurality of balls are accommodated within a rolling track formed by the opposite screw grooves, each bridge member has a linking groove on its inner surface to make the rolling track a circulating track, each bridge member is fit into a bridge window formed on a barrel of the nut;
    inserting a cylindrical mandrel, with projections, into the nut after fitting the bridge members in the bridge windows of the nut;
    pressing the projections of the mandrel onto both the bridge member linking groove and ball transfer parts of the screw grooves of the nut; and
    forming connection parts between the bridge members and the nut by plastic working.

2. The method for manufacturing a bridged ball screw of claim 1, wherein each of the projections of the mandrel has a configuration comprising a bridge forming part and connection parts, the bridge forming part corresponds to the linking groove of the bridge member, and the connection parts correspond to the ball transfer parts of the nut screw groove.

3. The method for manufacturing a bridged ball screw of claim 1, wherein an upper die is arranged above the nut, the upper die restricts the upper surface of the bridge member, the upper die is lowered and the mandrel is horizontally supported, the upper die is further lowered until the nut is sandwiched and supported by the upper die and the mandrel to plastically work the connection parts between the bridge member linking grooves and the nut screw grooves and simultaneously plastically deforms the upper surface of the bridge member in order to secure the bridge member to the nut bridge window by caulking the upper surface of the bridge member.

4. The method for manufacturing a bridged ball screw of claim 1, wherein the nut and the bridge member are simultaneous hardened by heat treatment after the plastic working.

* * * * *